Dec. 13, 1938.  R. H. MUELLER  2,140,245
ROD JOINT OR COUPLING
Filed Dec. 28, 1936
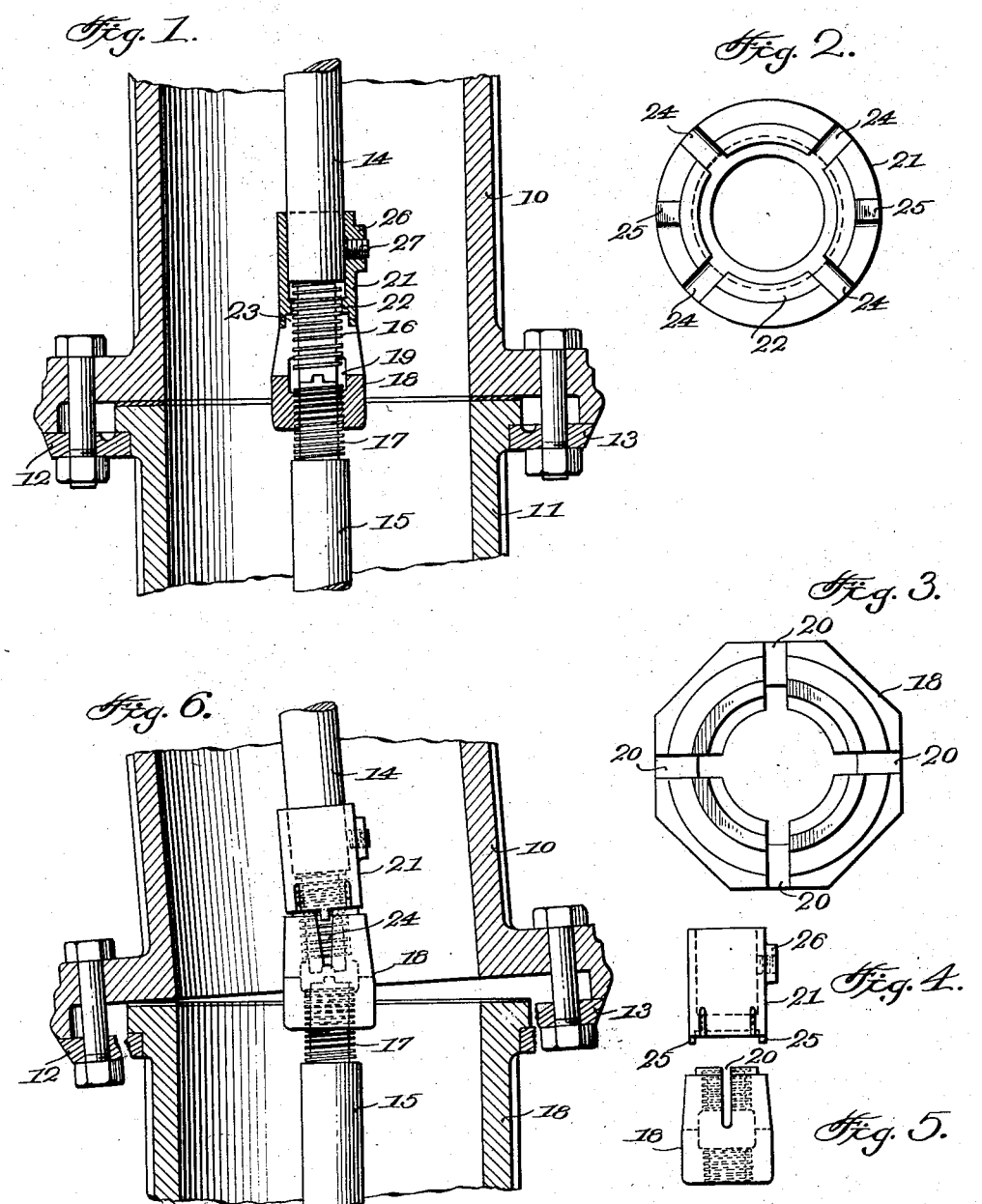
Inventor
Robert H. Mueller Patented Dec. 13, 1938

2,140,245

UNITED STATES PATENT OFFICE 2,140,245

ROD JOINT OR COUPLING

Robert H. Mueller, Decatur, Ill., assignor to Mueller Co., Decatur, Ill., a corporation of Illinois Application December 28, 1936, Serial No. 118,014

7 Claims. (Cl. 287—117)

The present invention relates to a rod joint or coupling and particularly to a rupturable joint or coupling for use in connecting the parts of a plural part valve operating stem for a fire hydrant. A purpose of the invention is to provide a joint which will maintain a sure operating connection between the stem parts under ordinary conditions but which is rupturable under conditions of extraordinary strain. To this end the joint includes a deformable sleeve or nut which serves normally to hold the stem parts together and an auxiliary member which serves to restrain the deformable sleeve against rotation and against too ready deformation.

In order that the invention may be readily understood, I shall describe it with reference to the illustrative embodiment shown in the accompanying drawing in which—

Figure 1 is a partial sectional view of a fire hydrant embodying the new joint,

Figure 2 is an end view of the auxiliary member,

Figure 3 is an end view of the sleeve,

Figure 4 is an elevation of the auxiliary member,

Figure 5 is an elevation of the sleeve, and

Figure 6 is a view similar to Figure 1 but showing the parts in a relation assumed as the result of a rupturing impact.

Referring to the drawing, reference numerals 10 and 11 designate the upper and lower sections or portions of a fire hydrant stock or barrel, the two portions being secured in end to end relation by means of a rupturable joint which includes the semi-annular members 12 and 13, this type of joint being disclosed in the prior patent to Herbert M. Lofton No. 2,017,600, granted Oct. 15, 1935.

The valve operating stem extends longitudinally of the barrel and includes the upper and lower portions 14 and 15, the former extending upwardly so as to be accessible for operative engagement and the latter extending downwardly to a flow controlling valve, here contemplated as being of rotary type.

As here shown, the adjacent ends of the stem portion are somewhat reduced and provided with the threads 16 and 17, the former having a somewhat steeper pitch than the latter. The adjacent extremities of the stem sections are provided with a mating tongue and groove held in engagement by a nut 18 engaged with the threads 16 and 17.

Nut 18 has medially an internal annular recess 19 which separates its threaded end portions. Externally it is somewhat tapered upwardly from its medial portion and this tapered portion is provided with a number of longitudinally extending slots 20. As here shown, four of the slots 20 are provided, the slots being spaced 90° apart. The lower portion of sleeve 18 may be formed as a hex for convenient engagement by a wrench.

In order to connect the stem sections, the sleeve 18 is threaded on the threads 17 as far as it will go and then the end of section 14 is threaded in the sleeve to bring the tongue and groove into register and as close together as possible. Hereupon, the stem sections are held against rotation and the sleeve 18 is screwed upwardly on the threads 17. Due to the differential pitch of the threads 16 and 17, stem portion 14 is drawn downwardly more rapidly than the sleeve 18 moves upwardly and as a result the stem sections are drawn into abutment with the tongue engaged in the groove so that rotary motion may be positively transmitted from the upper to the lower stem section.

The devices thus far described are substantially the same as disclosed in Patent 2,018,455, granted to Herbert M. Lofton on October 27, 1935. While such a coupling is ordinarily adequate, it has been found in use that vibration may in time cause the coupling sleeve to turn sufficiently relative to the stem portions to permit the disengagement of the tongue and groove so as to render the stem inoperative. Furthermore, the application of extreme torsional force occasionally causes stripping of the threads within the slotted portion of the sleeve.

To overcome these objectionable features, I have provided restraining means here shown in the form of an auxiliary sleeve 21 of a size to receive the lower end of the upper stem section. Adjacent its lower end, sleeve 21 has an annular rib 22 which has a sliding fit with the thread 16. At its lower extremity sleeve 21 has an annular recess which receives the annular reduced end 23 of sleeve 18. Also, sleeve 21 is provided with four equi-distantly spaced longitudinally extending slots 24 in its lower portion and with downwardly projecting lugs 25 diametrically spaced apart and of a size to engage opposite slots 20 of the sleeve 18. Adjacent its upper end sleeve 21 is provided with an outward boss 26 which is radially bored and threaded to receive a set screw 27.

With the two sleeves engaged as shown in Figure 1 and with the set screw 27 engaging section 14, it will be seen that the lugs 25 will prevent relative rotation of the sleeve 18 so that accidental separation of portions 14 and 15 cannot occur. Furthermore, upon extreme bending stress such as may occur upon impact of a vehicle, for example, with the upper barrel portion 10, the slotted portion of sleeve 18 will be deformed so that the upper stem section, as shown in Figure 6, can separate from the lower section without injury to the latter, but deformation of the slotted portion of sleeve 18 is restrained due to the fact that it is embraced or surrounded by the lower slotted end of sleeve 21. The restraining effect of sleeve 21 is sufficient to prevent stripping of the threads in the slotted portion of sleeve 18 under extreme torsional stress.

It is obvious that the sleeve 21 is assembled on the lower end of section 14, prior to the application to the latter of the sleeve 18. The lugs 25 of sleeve 21, it will be noted, are equi-distantly spaced from adjacent slots 24 so that the latter and slots 20 are in staggered relation as most clearly shown in Figures 4 to 6.

The sleeve 18 may be conveniently made of brass and the sleeve 21 may be a bronze casting, although obviously the invention may be embodied in other materials. Neither is the invention limited to the disclosure herein which is merely given as typical and accordingly I do not limit myself to the form and arrangement of parts except as in the following claims.

I claim:

1. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a second sleeve having a deformable end surrounding the extremity of the slotted portion of the first sleeve to restrain deformation of the latter.

2. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a deformable means embracing the slotted end of said sleeve to restrain deformation of the latter.

3. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a deformable means embracing the slotted end of said sleeve to restrain deformation of the latter, said deformable means being fixed to one of said rods and engaging said sleeve whereby to prevent relative rotation of said sleeve.

4. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a second sleeve having a deformable end surrounding the extremity of the slotted portion of the first sleeve to restrain deformation of the latter, said second sleeve being fixed to one of said rods and engaging the first sleeve to prevent relative rotation of the latter.

5. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a second sleeve having a longitudinally slotted end surrounding the extremity of the slotted portion of the first sleeve to restrain deformation of the latter, said second sleeve being fixed to one of said rods and having a portion engaged in a slot of the first sleeve to prevent relative rotation of the latter.

6. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, of a second sleeve having a longitudinally slotted end surrounding the extremity of the slotted portion of the first sleeve to restrain deformation of the latter, said second sleeve being fixed to one of said rods and having a portion engaged in a slot of the first sleeve to prevent relative rotation of the latter, the slots of said second sleeve being in staggered relation with the slots of the first sleeve.

7. The combination with a pair of aligned rods having juxtaposed threaded ends, and coupling means for said rods comprising an internally threaded sleeve in which both of said ends are threaded, the end of said sleeve in which one of said rod ends is engaged being longitudinally slotted so as to be deformed upon relative bending of said rods to release said one of said rod ends, the extremity of the slotted end of said sleeve being reduced, of a second sleeve having an annular end recess in which the reduced extremity of the first sleeve is received so that deformation of the latter is restrained.

ROBERT H. MUELLER.